Figure 1:
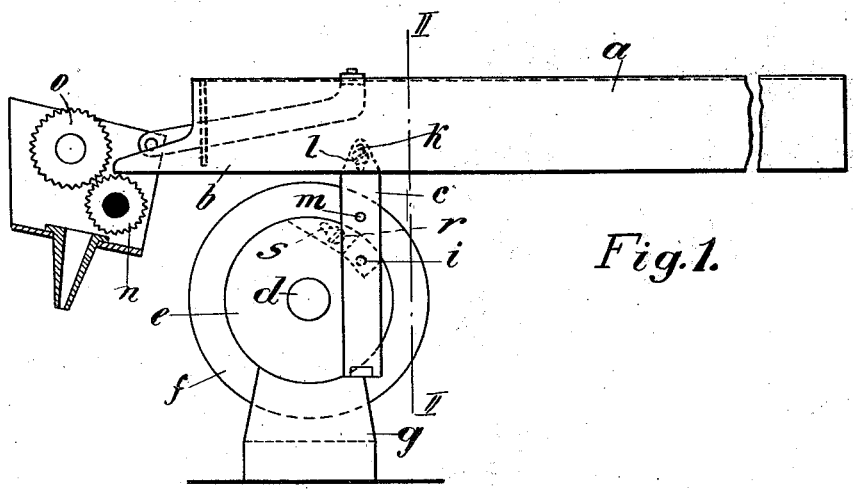

R. GRABEIN.
MECHANISM FOR SUPPLYING SINGLE HAIRS TO A SPINNING MACHINE.
APPLICATION FILED JAN. 14, 1911.

1,062,152.

Patented May 20, 1913.

WITNESSES
W. P. Burke
John C. Sanders

INVENTOR
Reinhold Grabein
By
ATTY.

UNITED STATES PATENT OFFICE.

REINHOLD GRABEIN, OF FORST, GERMANY.

MECHANISM FOR SUPPLYING SINGLE HAIRS TO A SPINNING-MACHINE.

1,062,152.  Specification of Letters Patent.  Patented May 20, 1913.

Application filed January 14, 1911. Serial No. 602,617.

*To all whom it may concern:*

Be it known that I, REINHOLD GRABEIN, of 9 Richtstrasse, Forst, in Lusatia, in the German Empire, have invented a new and useful Improvement in Mechanism for Supplying Single Hairs to a Spinning-Machine, of which the following is a specification.

This invention relates to mechanism for conveying single hairs or the like from a bundle for the purpose of producing a continuous thread and more especially a horsehair-thread. In mechanism of this kind it has heretofore been usual to draw the single hairs from the bundle and to convey them to the feed rolls by means of reciprocating pincers, or by imparting a reciprocating movement to the receptacle containing the bundles of hair, the pincers remaining stationary. Such devices are, however, all subject to the defect that the reciprocating movement of the mechanism gives rise to vibrations which renders it difficult to grip single hairs with certainty; and these vibrations, moreover, often result in disturbing the position of the hairs in the receptacle as well as the position of the single hairs relatively to each other, with the result that the forward movement of the hairs may cease to be uniform. For all these reasons it has been impracticable, by means of any of the mechanism heretofore devised to effect a uniform feed and consequently also to produce a uniform thread. Moreover in all the mechanism heretofore proposed it is necessary to draw out the horsehair and to move it forward to some extent, with the result that in all such mechanism the distance between the gripping device and the drawing-out device has had to be relatively large which again has rendered it impracticable to use horsehair of less than a certain minimum length.

Now in mechanism in accordance with this invention these defects are obviated by causing a uniformly rotating pair of pincers of the pincette type to move tangentially past the bundle of horsehair and during such movement to grip a number of hairs, the precise quantity being capable of regulation, to hold them, to move them forward and then again to release them. By means of this mechanism a uniform thread can consequently be produced from very short hairs and even from waste hairs which hitherto could not have been utilized. The quantity of horsehair taken up during each rotation can very easily be adjusted during the operation. The steady working of the mechanism due to the absence of reciprocating parts enables the apparatus to be operated at a considerably increased speed with a corresponding increase in the output.

The accompanying drawings illustrate mechanism in accordance with this invention; wherein—

Figures 2, 3:
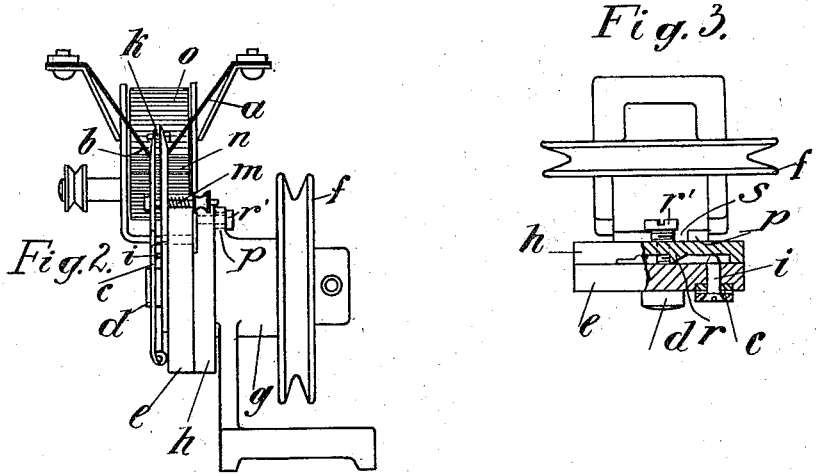

Figure 1 is a side elevation of the mechanism; Fig. 2 is a vertical transverse section on the line II—II of Fig. 1 and Fig. 3 is a plan view of the gripping mechanism.

Referring to the drawings: $a$ indicates the trough through which the bundle of horsehair is fed and which is provided at its lower portion with a slot $b$, through which the pincers $c$ enter as they rotate upon the shaft $d$. The pincers are fixed as shown upon the rotating disk $e$ which is actuated by the cord-pulley $f$. The shaft $d$ of the disk $e$ is supported by the bearing $g$ to which there is attached a plate $h$ carrying a face cam $r$ that as the disk $e$ rotates actuates the pincers $c$. For this purpose the disk $e$ is furnished with a pin $i$ that projects parallel to the shaft $d$ and one end of which bears against the face of the cam $r$ while its other end bears against the free arm of the pincers $c$. During the rotation of the disk $e$ the pin $i$ is caused to move in the direction of its length and thereby to open the pincers. The opening of the pair of pincers can be accelerated or retarded by adjusting the position of the plate $h$ by rotating it on the rigid bearing $g$. Adjustment is effected by means of the set screw $r'$ which passes through a flange $p$ formed on the rigid bearing $g$ and into the plate $h$. A slot $s$ is provided in said flange $p$ as shown in Fig. 3. By causing the pincers to open sooner or later the distance to which the horsehairs are drawn out of the bundle of hair can be varied. In order to determine with accuracy the quantity of hair to be drawn during each rotation from the bundle of hair the pincers are furnished at their extremity with a small threaded pin k which bridges the gap between the two arms of the pincers when moved apart. This pin can be adjusted in a slot l and by this means the quantity of hair taken up during one rotation can be varied as desired. The pincers are normally closed by means of a spring m their opening being effected only by the pressure of the pin i. During the rotation of the disk e and the pair of pincers the hairs are gripped, drawn out of the bundle of horsehair, and fed to the rollers n o whence they are conducted through a funnel to the spindle.

Having now particularly described and ascertained the nature of my said invention and in what manner the same is to be performed, I declare that what I claim is:—

1. In a device of the class described, in combination, a horizontally disposed trough adapted to hold the hair, said trough being fixed, said trough being provided with a slot in its lower portion extending in the direction of its length, feed rolls, rotatable pincers positioned below said trough and adapted to pass through said slot in the direction of the length of the trough to grasp the hair and convey it from said trough to said feed rolls, said pincers being positioned tangentially with respect to the direction of rotation, and means to rotate said pincers.

2. In a device of the class described, in combination, a horizontally disposed trough adapted to hold the hair, said trough being fixed, said trough being provided with a slot in its lower portion extending in the direction of its length, feed rolls, rotatable pincers positioned below said trough and adapted to pass through said slot in the direction of the length of the trough to grasp the hair and convey it from said trough to said feed rolls, means comprising a cam member for controlling the opening-and-closing movement of said pincers, said pincers being positioned tangentially with respect to the direction of rotation, and means to rotate said pincers.

3. In a device of the class described, in combination, a horizontally disposed trough adapted to hold the hair, said trough being fixed, said trough being provided with a slot in its lower portion extending in the direction of its length, feed rolls, rotatable pincers positioned below said trough and adapted to pass through said slot in the direction of the length of the trough to grasp the hair and convey it from said trough to said feed rolls, said pincers being positioned tangentially with respect to the direction of rotation, a reciprocatable pin engaging one of the arms of said pincers, a spring normally holding the arms of said pincers in closed position, means for reciprocating said pin during the rotation of said pincers whereby they will be opened and closed, and means to rotate said pincers.

4. In a device of the class described, in combination, a horizontally disposed trough adapted to hold the hair, said trough being fixed, said trough being provided with a slot in its lower portion extending in the direction of its length, feed rolls, rotatable pincers positioned below said trough and adapted to pass through said slot in the direction of the length of the trough to grasp the hair and convey it from said trough to said feed rolls, said pincers being positioned tangentially with respect to the direction of rotation, means to rotate said pincers, and adjustable means positioned adjacent the gripping ends of said pincers to control the quantity of hair which is gripped thereby.

5. In a device of the class described, in combination, a fixed trough adapted to hold the hairs and provided with a slot extending in the direction of its length, a rotatable member positioned below said slot, a pair of pincers carried thereby, said pincers being positioned tangentially with respect to the direction of rotation of said member, whereby the pincers will pass through said slot in the direction of the length of the hair, means to rotate said member, and means to close and open said pincers, whereby they will grasp the hair and carry it along the trough.

6. In a device of the class described, in combination, a trough adapted to hold the hairs and provided with a slot in its bottom portion extending in the direction of its length, a rotatable member positioned below said trough, a pair of pincers carried by said member, the gripping ends of said pincers extending through the slot and into the trough to grip the hairs as said member is rotated, means to rotate said member, and a cam member to open and close said pincers, whereby they will grasp the hair and feed it along the trough, said cam member being adjustable relatively to said rotatable member, whereby the time of opening and closing said pincers may be accelerated or retarded.

7. In a device of the class described, in combination, a trough adapted to hold the hairs and provided with a slot in its bottom portion extending in the direction of its length, a rotatable member positioned below said trough, a pair of pincers carried by said member, the gripping ends of said pincers extending through the slot and into the trough to grip the hairs as said member is rotated, means to rotate said member, one of the arms of said pincers being movable, yielding means normally keeping said arms closed, a pin carried by said movable arm, and a cam member with which said pin engages, said cam being shaped to cause said pin to open and close said pincers, whereby they will grasp the hair and feed it along the trough, said cam member being adjustable relatively to said rotatable member, whereby the time of opening and closing said pincers may be accelerated or retarded.

In testimony whereof I affix my signature in presence of two witnesses.

REINHOLD GRABEIN.

Witnesses:
　WILHELM SCHMURSCK,
　RICHARD VOGT.